Feb. 13, 1962   H. KEMPEL ET AL   3,021,166
VEHICLE HOISTING ARRANGEMENT
Filed Dec. 8, 1959   3 Sheets-Sheet 2
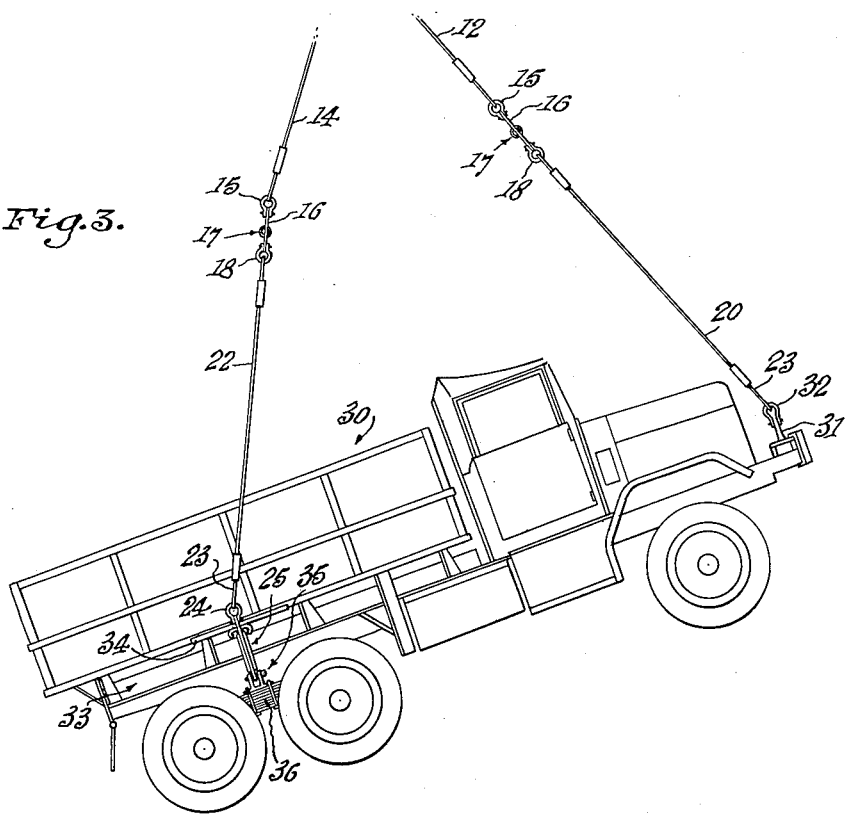
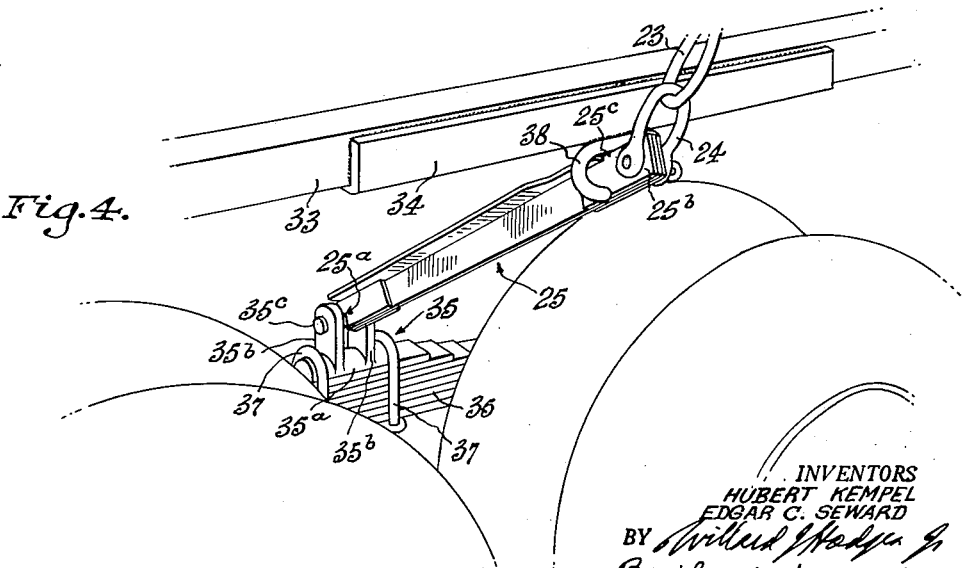
INVENTORS
HUBERT KEMPEL
EDGAR C. SEWARD
BY
ATTORNEYS Feb. 13, 1962    H. KEMPEL ET AL    3,021,166
VEHICLE HOISTING ARRANGEMENT
Filed Dec. 8, 1959    3 Sheets-Sheet 3

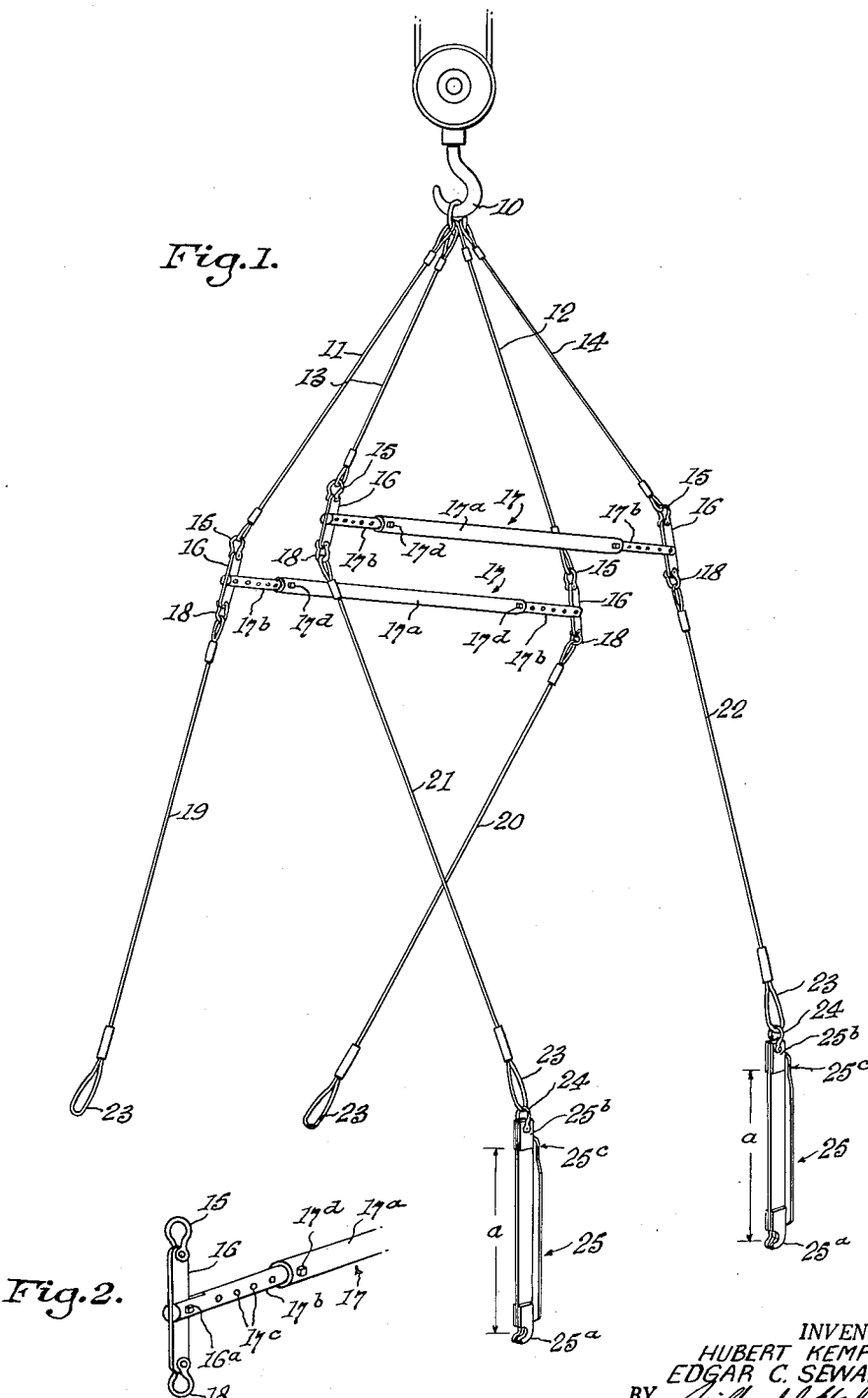

INVENTORS
HUBERT KEMPEL
EDGAR C. SEWARD
BY
ATTORNEYS

United States Patent Office 3,021,166
Patented Feb. 13, 1962

3,021,166
VEHICLE HOISTING ARRANGEMENT
Hubert Kempel, Washington 16, D.C. (4801 Dover Road, Md.), and Edgar C. Seward, 2008 S. Randolph St., Arlington 4, Va.
Filed Dec. 8, 1959, Ser. No. 858,297
14 Claims. (Cl. 294—74)
(Granted under Title 35, U.S. Code (1952), sec. 266)

The invention described herein may be manufactured and used by or for the Government for governmental purposes without the payment of any royalty thereon.

The present invention relates to a vehicle hoisting arrangement.

More particularly, the present invention relates to a vehicle hoisting or lifting arrangement, especially an arrangement by which motor trucks may be lifted and moved about, such as for shipboard loading and unloading.

There exist various types of hoists or lifting arrangements, and the most convenient and practical ones have been found to be slings or the like in which there are a number of suspended cables that are attached to the vehicle. However, even the best of existing slings have the disadvantage that it is often difficult, time-consuming and sometimes even dangerous to attach the cables of the sling to the vehicle, or to release the cables from the vehicle after the loading or unloading operation has been completed.

It is therefore an object of the present invention to provide a hoist arrangement which overcomes the above disadvantages.

It is another object of the present invention to provide a hoist arrangement which is of simple and rugged construction.

It is a still further object of the present invention to provide a hoist arrangement which can readily be used in conjunction with existing vehicles, such as military 2½-ton 6 x 6 trucks or vans.

The objects of the present invention also include the provision of a hoist arrangement which is easily attached and detached even in tight quarters, such as are encountered in loading vehicles onto landing craft in military amphibious operations, particularly an arrangement which can be detached from the vehicle automatically without it being necessary for operating personnel to be in or near the vehicle. This is especially desirable in wartime amphibious operations where vehicles are loaded into landing craft during rough weather.

It is yet another object of the present invention to provide a hoist which reduces the stress on the vehicle.

Additional objects and advantages of the present invention will become apparent upon consideration of the following specification, when taken in conjunction with the accompanying drawings, in which—

FIG. 1 is a perspective view of a hoist arrangement according to the present invention;

FIG. 2 is a perspective view of a detail of the hoist shown in FIG. 1;

FIG. 3 is a side view of a hoist arrangement according to the present invention shown in conjunction with a vehicle being lifted;

FIG. 4 is a perspective view showing certain parts of the invention in detail;

Figure 5:
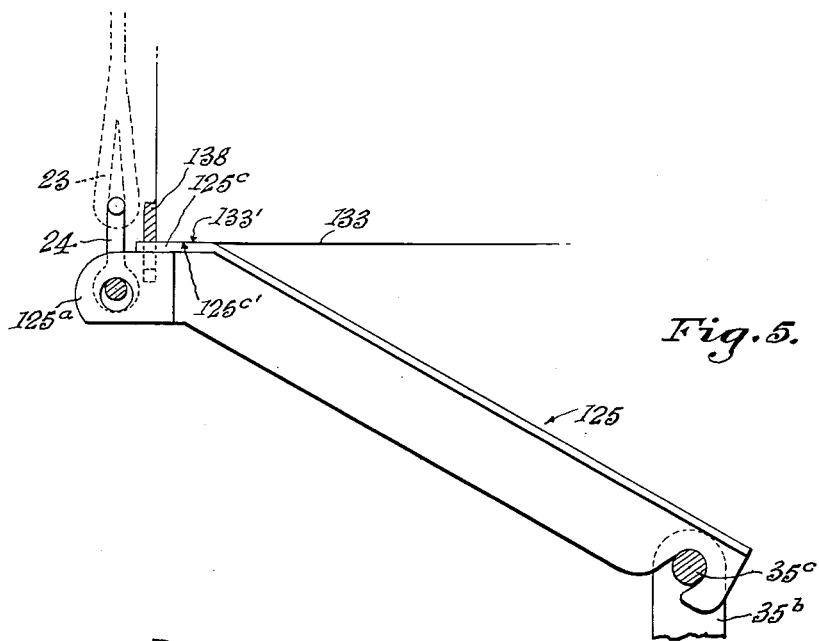
FIG. 5 is an elevational view of a modified embodiment of the present invention.

Referring now to the drawings and to FIGS. 1 to 4 thereof in particular, there is shown a hoist arrangement according to the present invention. The same comprises a hook 10 which is attached to a crane or other lifting device (not shown) of conventional design. The hook has suspended from it four cables 11, 12, 13, and 14, the ends of which are attached to clevises 15 that are secured to two pairs of bars 16. The bars of each pair are maintained in spaced relation by an adjustable spacer rod 17. As is best shown in FIG. 2, each spacer rod is composed of a tubular central piece 17a carrying at each end a telescopically arranged extension element 17b formed with a plurality of longitudinally spaced bores 17c. The central piece 17a is formed near each end with a transverse bore through which passes a retaining pin 17d. Thus, the overall length of the spacer rod 17 may be adjusted by removing the pin 17d and moving the corresponding extension element 17b inwardly or outwardly until a different bore 17c is in registration with the transverse bore of the central piece 17a, whereupon the pin 17d is reinserted to maintain the extension element 17b in the desired position.

Each bar 16 is arranged in a slot formed in the free end of one of the extension elements 17b, is held in place by a pin 16a, and carries a clevis 18 at its free end. Each clevis supports a cable 19, 20, 21, and 22 terminating in a loop 23. The loops of the cables 19 and 20 are free, whereas the loops of the cables 21 and 22 each have attached thereto a clevis 24 which is secured to a hoist member 25.

In the embodiment shown in FIGS. 1 to 4, each hoist member 25 is straight throughout its entire length, and has a web and flange so as to give it a T-shaped cross-section. If desired, the hoist member can be composed of two angle-shaped pieces which are welded to each other to form the T-shaped cross-section.

Each hoist member has at one end a hook portion 25a and at the other end a cable attachment portion 25b, it being at this end that the clevis 24 is attached to the hoist member. Intermediate the two ends, but substantially nearer to the cable attachment portion 25b than to the hook portion 25a, the hoist member has an abutment portion 25c, and the hook and abutment portions are spaced from each other a distance a the significance of which will become apparent below.

FIG. 3 shows the hoist while the same is lifting a motor vehicle, which is shown as a conventional 2½-ton 6 x 6 military cargo truck. This vehicle is equipped at its front bumper with hooks 31, one of which is shown in FIG. 3, which hooks are engaged either by the loops 23 of the cables 19 and 20, or by clevises 32 attached to the loops.

As is best shown in FIG. 4, the vehicle 30 is also equipped with a chassis 33 at each side of which there is an abutment means in the form of a reinforcing steel angle iron 34 which is attached to the bottom corner of the overhanging portion of the truck chassis. The vehicle additionally carries upwardly extending hook means 35 in the form of a base plate 35a having two upstanding ears 35b between which there extends a pin 35c. The hook means 35 are secured to the rear spring 36 on each side of the vehicle by two C-shaped clamps 37, the free ends of which are fastened together beneath the spring 36.

As is clearly shown in FIG. 4, the hook means are spaced downwardly and inwardly from the abutment means constituted by the angle iron 34, and the parts are spaced from each other a distance corresponding to the above mentioned distance a which the hook portion 25a and abutment portion 25c of the hoist member 25 are spaced from each other. Thus, the hoist member can be placed into engagement with the vehicle in an operative position, shown in FIG. 4, in which the hoist member is upwardly and outwardly inclined while its hook portion 25a is hooked to the hook means 35, its abutment portion 25c abuts the abutment means 34, and the cable attachment portion 25b extends laterally of the vehicle.

When the two hoist members are each in their respective operative positions, on opposite sides of the vehicle, an upward force applied simultaneously through the cables 21 and 22 will cause force-transmitting connections to be established between the hoist members 25 and the vehicle 30, i.e., when the hoist is raised, the weight of the vehicle will ensure a firm connection to be established between the hoist members 25 and the vehicle, it being clear that the heavier the vehicle, the stronger the grip will be which the hoist members exert on the vehicle. On the other hand, when the hoist is lowered to the point where the vehicle rests on a supporting surface, the connection between the hoist members and the vehicle may be released simply by lowering the hoist a little more, whereupon the hoist members will disengage from the vehicle automatically.

In order to insure that the cables 21, 22 will exert a substantially vertical lifting force, the bars 16 to which they are attached should be spaced apart a distance roughly equal to the width of the vehicle. This may readily be accomplished by adjusting the overall length of the adjustable spacer rod 17 in the manner described above.

In order to prevent displacement of the hoist members in the longitudinal direction of the vehicle, there are provided suitable positioning means in the form of a C-shaped element 38 on each side of the chassis. These elements 38 are attached in the region of the abutment means, such as by being welded or otherwise securely fastened directly to the angle iron 34. As is shown in FIG. 4, the hoist member 25 is received between the legs of the C-shaped element 38, thus preventing the abutment portion end of the hoist member from being displaced in the longitudinal direction of the vehicle. Also, it will be seen that the hook portion end is prevented from being displaced in the longitudinal direction of the vehicle by the upstanding ears 35b, the arrangement being such that each end of the hoist member is held in substantially the same transverse plane of the vehicle.

In order to strengthen the hoist member 25, each of its end portions may be reinforced by suitable plates, such as are shown in FIG. 4.

Figure 6:
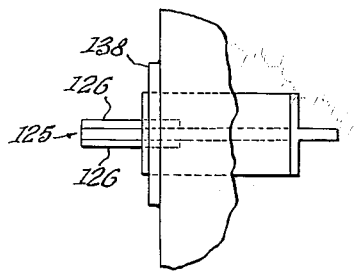
FIG. 6 is a plan view of the embodiment shown in FIG. 5.
Figure 7:
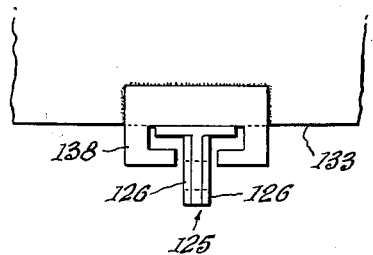
FIG. 7 is a side view of the embodiment shown in FIG. 5.

FIGS. 5 to 7 show a modified embodiment of a hoist member according to the present invention. It differs from the above described embodiment in that the hoist member 125 is formed with a bent terminal section which incorporates the cable attachment portion 125a and the abutment portion 125c. The latter has an abutment surface 125c' which, when the hoist member is in its operative position, is directed upwardly and seats upon the downwardly directed abutment surfaces 133' of the truck chassis 133, the latter thus constituting the abutment means proper without the intermediary of a reinforcing iron such as 34 in FIG. 4. It will be understood, however, that a flat or angle-shaped reinforcing iron may be provided, if desired.

The instant embodiment also differs from the one described above in that it is provided with flat reinforcing strips 126 arranged on opposite sides of the web of the hoist member 125 which, as the above-described hoist member 25, is also of T-shaped cross-section.

The C-shaped element 138 which serves as a positioning means to prevent longitudinal displacement of the hoist member 125, differs from its counterpart 38 of the previously described embodiment, in that it is in the form of a flat plate and has rectangular leg portions which more closely conform to the cross-sectional configuration of the hoist member.

The above description of the present invention will enable any persons skilled in the art to practice the same. It is apparent, however, that the disclosed structure is susceptible to variations and modifications without departing from the essence of the invention. Accordingly, such variations and modifications are intended to be included so as to fall within the spirit and scope of the appended claims.

We claim:

1. In a vehicle hoist for a vehicle having a chassis, a suspension system, and abutment means on said chassis, and hook means on said suspension system spaced downwardly and inwardly from said abutment means, the combination which comprises: an elongated hoist member having a hook portion and an abutment portion which are spaced from each other a distance equal to the distance which said abutment means and hook means of the vehicle are spaced from each other, so that said hoist member may be placed into engagement with the vehicle in an operative position in which said hoist member is upwardly and outwardly inclined while said hook portion is hooked to said hook means and said abutment portion abuts said abutment means; and a cable attached to said hoist member for applying thereto an upwardly directed force which when said hoist member is in said operative position thereof, causes a force-transmitting connection to be established between said hoist member and the vehicle.

2. In a vehicle hoist for a vehicle having a chassis, a suspension system, and abutment means on said chassis, and hook means on said suspension system spaced downwardly and inwardly from said abutment means, the combination which comprises: an elongated hoist member having a hook portion at one end, cable attachment means at the other end, and an abutment portion intermediate said ends, said hook portion and abutment portion being spaced from each other a distance equal to the distance which said abutment means and hook means of the vehicle are spaced from each other so that said hoist member may be placed into engagement with the vehicle in an operative position in which said hoist member is upwardly and outwardly inclined while said hook portion is hooked to said hook means, said abutment portion abuts said abutment means, and said cable attachment means extends laterally of the vehicle; and a cable attached to said cable attachment means of said hoist member for applying an upward force which when said hoist member is in said operative position thereof, causes a force-transmitting connection to be established between said hoist member and the vehicle.

3. In combination with a vehicle having a chassis, a suspension system, and at each side and a lateral abutment means on said chassis, and a hook means on said suspension system which is spaced downwardly and inwardly from the respective abutment means, a hoist which comprises: two elongated hoist members each having a hook portion at one end, cable attachment means at the other end, and an abutment portion intermediate said ends, said hook portion and abutment portion being spaced from each other a distance equal to the distance which the abutment means and hook means on the same side of the vehicle are spaced from each other so that each hoist member may be placed into engagement with the vehicle on one side thereof in an operative position in which each hoist member is upwardly and outwardly inclined while its hook portion is hooked to one of said hook means, its abutment portion abuts the corresponding abutment means, and its cable attachment means extends laterally of the vehicle; and two cable means attached to said cable attachment means of said hoist members, said cable means being interconnected above the vehicle for simultaneously applying upward forces on said hoist members which while the same are in their respective position, cause force-transmitting connections to be established between said hoist members and the vehicle.

4. In combination with a vehicle having a chassis and a rear spring on each side of the vehicle, which chassis has on each side thereof a lateral abutment means and each of which rear springs has attached to it a hook means which is spaced downwardly and inwardly from the abutment means on the same side, a hoist which comprises: a pair of elongated hoist members each having a hook portion at one end, cable attachment means at the other end, and an abutment portion intermediate said ends, said hook portion and abutment portion being spaced from each other a distance equal to the distance which the abutment means and hook means on the same side of the vehicle are spaced from each other so that each hoist member may be placed into engagement with the vehicle on one side thereof in an operative position in which each hoist member is upwardly and outwardly inclined while its hook portion is hooked to one of said hook means, its abutment portion abuts the corresponding abutment means, and its cable attachment means extends laterally of the vehicle; and two cable means attached to said cable attachment means of said hoist members, said cable means being interconnected above the vehicle for simultaneously applying upward forces on said hoist members which while the same are in their respective operative positions, cause force-transmitting connections to be established between said hoist members and the vehicle.

5. In a vehicle hoisting arrangement, the combination which comprises: a vehicle having a chassis and a rear spring on each side of the vehicle, said chassis having on each side thereof a lateral abutment means, and each rear spring having attached to it a hook means which is spaced downwardly and inwardly from the corresponding abutment means; a pair of elongated hoist members each having a hook portion at one end, cable attachment means at the other end, and an abutment portion intermediate said ends, said hook portion and abutment portion being spaced from each other a distance equal to the distance which the abutment means and hook means on the same side of the vehicle are spaced from each other so that each hoist member may be placed into engagement with the vehicle on one side thereof in an operative position in which each hoist member is upwardly and outwardly inclined while its hook portion is hooked to one of said hook means, its abutment portion abuts the corresponding abutment means, and its cable attachment means extends laterally of the vehicle; and two cable means attached to said cable attachment means of said hoist members, said cable means being interconnected above the vehicle for simultaneously applying upward forces on said hoist members which while the same are in their respective positions, cause force-transmitting connections to be established between said hoist members and the vehicle.

6. The combination defined in claim 5 wherein said vehicle further has two C-shaped positioning means attached to said chassis in the regions of the respective abutment means for preventing displacement of said abutment portions of said hoist members when the same are in their respective operative positions, in the longitudinal direction of the vehicle.

7. The combination defined in claim 5 wherein said hook means comprises a base plate supporting a pair of mutually spaced upstanding ears and a pin rigidly affixed to and extending between said upstanding ears so that when said hook portions snugly engage said pin displacement of said hook portions is prevented, when said hoist members are in their respective operative positions, in the longitudinal direction of the vehicle.

8. The combination defined in claim 5 wherein each of said hoist members is of T-shaped cross-section.

9. The combination defined in claim 5 wherein each of said hoist members is straight throughout its entire length.

10. The combination defined in claim 5 wherein each hoist member is formed with a bent terminal section which incorporates said other end of the hoist member as well as said abutment portion thereof, the latter having an abutment surface which when said hoist member is in its operative position is directed upwardly and seats upon a downwardly directed abutment surface which forms part of the abutment means of said vehicle.

11. A hoist attachment for a vehicle having a rear spring on each side thereof and a chassis, said attachment comprising, in combination: hook means mounted on each of said rear springs; and abutment means on said chassis spaced upwardly and outwardly of said hook means.

12. A hoist attachment for a vehicle having a rear spring on each side thereof and a chassis, said attachment comprising, in combination: hook means mounted on each of said rear springs; and abutment means on said chassis spaced upwardly and outwardly of said hook means, all of said hook means and abutment means being in substantially the same vertical transverse plane of the vehicle.

13. A hoist attachment for a vehicle having a rear spring on each side thereof and a chassis, said attachment comprising, in combination: hook means mounted on each of said rear springs; abutment means on said chassis spaced upwardly and outwardly of said hook means; and C-shaped positioning means arranged in the region of said abutment means for preventing longitudinal displacement of a hoist member engaging said hook means and said abutment means.

14. A hoist attachment for a vehicle having a rear spring on each side thereof, and a vehicle chassis having opposite side portions which are located upwardly and outwardly of said rear springs, said attachment comprising, in combination: hook means mounted on each of said rear springs; and abutment means on said side portions of said chassis.

References Cited in the file of this patent

UNITED STATES PATENTS

| | | |
|---|---|---|
| 1,320,723 | Wood et al. | Nov. 4, 1919 |
| 1,381,761 | Stansbury et al. | June 14, 1921 |
| 1,421,993 | Rofe | July 4, 1922 |
| 1,422,928 | Colling | July 18, 1922 |
| 1,468,928 | Steadman | Sept. 25, 1923 |
| 1,853,410 | Friedel | Apr. 12, 1932 |
| 2,039,010 | Leggat | Apr. 28, 1936 |
| 2,054,800 | Adams | Sept. 22, 1936 |
| 2,061,026 | Dwork | Nov. 17, 1936 |
| 2,083,942 | Chase | June 15, 1937 |
| 2,216,203 | Leighton | Oct. 1, 1940 |